(12) United States Patent
Akemakou

(10) Patent No.: US 6,472,789 B1
(45) Date of Patent: Oct. 29, 2002

(54) ELECTRIC ROTARY MACHINE WITH NOVEL ROTOR EXCITATION ARRANGEMENT BY PERMANENT MAGNETS

(75) Inventor: Antoine Dokou Akemakou, Vitry-sur-Seine (FR)

(73) Assignee: Valeo Equipement Electriques Moteur, Creteil (FR)

( * ) Notice: Subject to any disclaimer, the term of this patent is extended or adjusted under 35 U.S.C. 154(b) by 0 days.

(21) Appl. No.: 09/830,053

(22) PCT Filed: Oct. 20, 1999

(86) PCT No.: PCT/FR99/02550

§ 371 (c)(1),
(2), (4) Date: Apr. 20, 2001

(87) PCT Pub. No.: WO00/24110

PCT Pub. Date: Apr. 27, 2000

(30) Foreign Application Priority Data

Oct. 20, 1998 (FR) .............................................. 98 13119

(51) Int. Cl.$^7$ ................................................. H02K 1/27
(52) U.S. Cl. ......................... 310/156.57; 310/156.55; 310/156.49; 310/156.53; 310/156.56
(58) Field of Search ................................... 310/156, 261

(56) References Cited

U.S. PATENT DOCUMENTS

| | | | | |
|---|---|---|---|---|
| 4,354,126 A | * | 10/1982 | Yates ..................... | 310/156.59 |
| 4,504,755 A | | 3/1985 | Semones et al. ............ | 310/156 |
| 4,700,096 A | | 10/1987 | Epars ......................... | 310/156 |
| 5,378,953 A | * | 1/1995 | Uchida et al. ......... | 310/156.59 |

FOREIGN PATENT DOCUMENTS

| | | |
|---|---|---|
| DE | 1488733 | 6/1969 |
| DE | 2062486 | 6/1972 |
| EP | 0538472 | 4/1993 |
| FR | 2 578 116 | 8/1986 |
| GB | 2289991 | 12/1995 |
| WO | 91/09443 | 6/1991 |

* cited by examiner

Primary Examiner—Burton S. Mullins
(74) Attorney, Agent, or Firm—Morgan & Finnegan LLP

(57) ABSTRACT

The invention relates to an electric rotary machine having a stator with several slots for receiving field coils and a rotor having excitation means with main permanent magnets housed in a rotor structure to define a plurality of successive North and South poles (N. S.). The invention is characterized in that the rotor structure has a plurality of barrier zones substantially impermeable to the magnetic current which are arranged with respect to the main magnets such that a substantial part of a magnetic current input in a main magnet is derived at least from one South pole and adjacent to the magnet and a substantial part of a magnetic current output by one magnet is directed toward at least one North pole adjacent to the magnet. Thus, the invention provides a lighter, less costly and more efficient rotor. The invention is applicable to starters or AC-starters for motor vehicles.

17 Claims, 4 Drawing Sheets

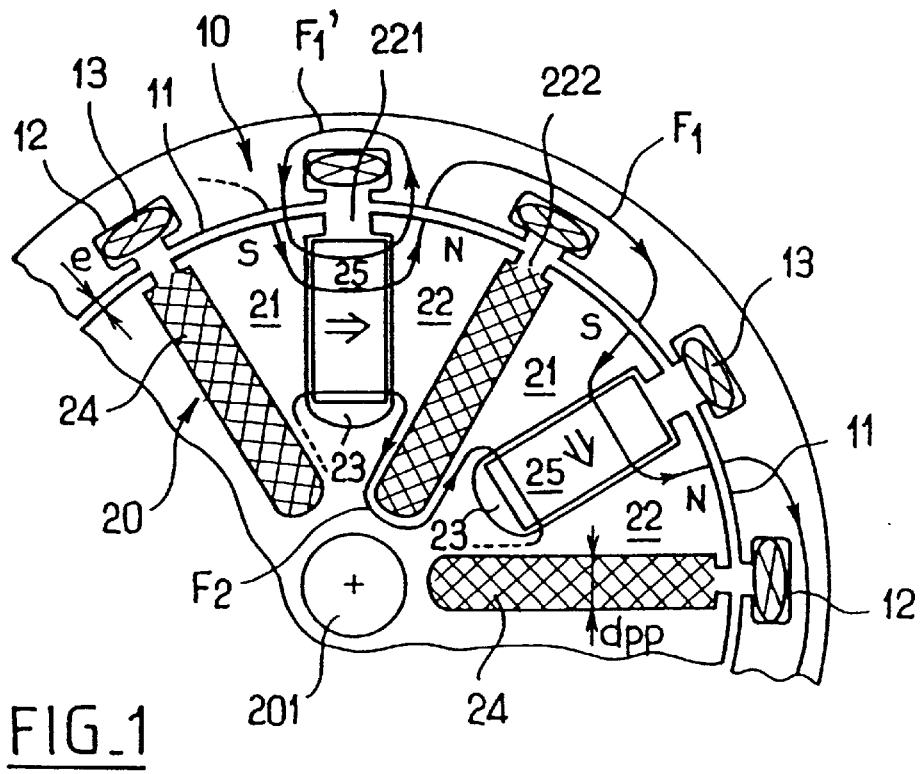
FIG_1
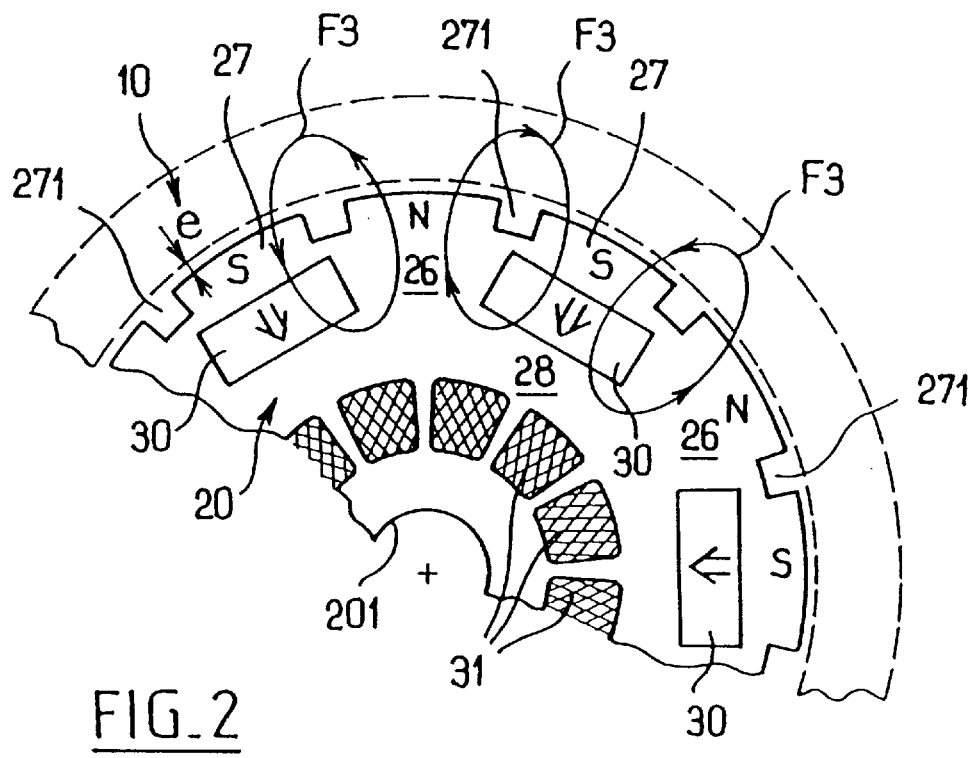
FIG_2

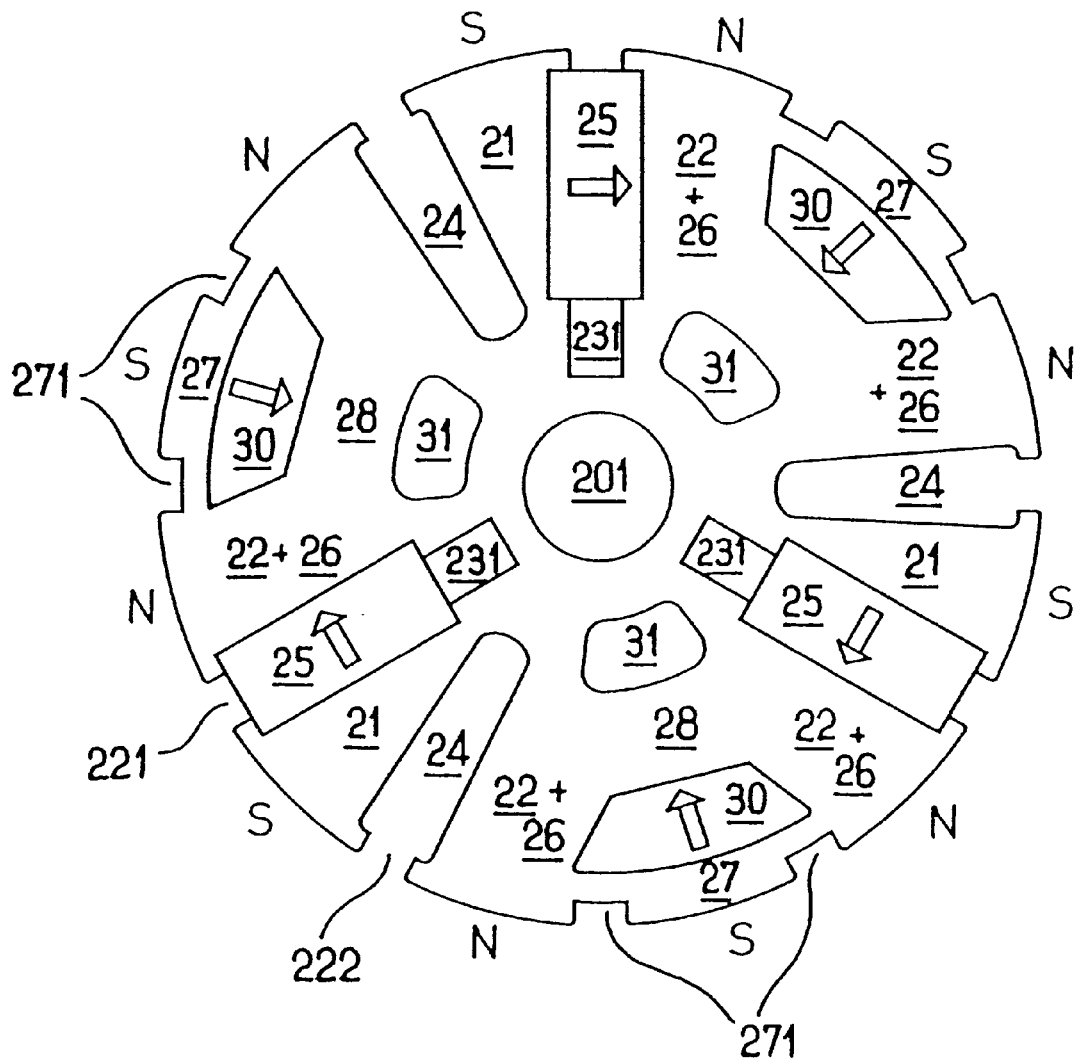
FIG_6

ELECTRIC ROTARY MACHINE WITH NOVEL ROTOR EXCITATION ARRANGEMENT BY PERMANENT MAGNETS

The present invention relates in general to the field of rotary machines, and more particularly to the field of AC motors or generators in which the rotor is excited by permanent magnets.

Such machines are well known. When rotor excitation is performed solely by means of permanent magnets, then the machine can be simplified very significantly, in particular by avoiding any need to provide rotor windings and the associated dispositions, i.e. wipers, wiper-carriers, etc. . . . . .

This provides a machine that is less expensive and more reliable.

Unfortunately, in known machines it is necessary to provide one magnet per pole of the rotor and this gives rise to problems of weight and of cost depending largely on the cost of the magnets.

Furthermore, in such machines, various problems arise because it is impossible to control the degree of excitation, and these are set out in particular in the document "*Analyse des possibilités de fonctionnement en régime de désexcitation des moteurs characterized aimants permanents*" [Analysis of the possibilities of operating permanent magnet motors under deexcitation conditions] by Multon et al., published in J. Phys. III France 5, 1995, les Editions de Physique 1995.

More precisely, in particular for a motor vehicle alternator, the wide range of possible speeds of rotation and also the wide range of electrical power levels drawn, mean that the motor must be capable of delivering a highly variable level of working flux, i.e. it must be capable of giving rise within itself to relatively high levels of defluxing phenomena.

Furthermore, as shown in particular in the above-mentioned document, permanent magnet machines typically have as many magnets as the rotor has poles, thus making them expensive, heavy, and sometimes difficult to design, and in particular they can have insufficient capacity for defluxing.

Thus, for example, a machine whose rotor possesses successive magnets of alternating polarity must include intermediate magnetic pieces for defluxing purposes between each pair of adjacent magnets, the intermediate magnetic pieces serving to carry defluxing flux and thus lowering nominal performance.

Machines are already known in which the number of magnets possessed by the rotor is less that the number of rotor poles, and typically the number of permanent magnets is equal to half the number of poles.

Nevertheless, those known machines present limitations in that the magnetic flux between the magnets and the poles is poorly controlled, thereby degrading machine efficiency, and in that the flux is poorly adapted to applications of the motor vehicle alternator or alternator-starter type which require high defluxing capacity.

The present invention seeks to mitigate the limitations of the state of the art and to propose an electric machine having permanent excitation in which the rotor is less expensive and simpler to make, and is of reduced weight, while still providing defluxing capacity that is compatible in particular with alternator or alternator-starter type applications, and which also enables flux to be well channeled between the magnets and the poles of the rotor.

The present invention thus provides a rotary electric machine comprising a stator possessing a plurality of slots receiving stator windings, and a rotor including excitation means constituted by main permanent magnets received in a rotor structure to define a plurality of successive north and south poles, the number of main permanent magnets provided being half the number of poles, the machine being characterized in that the rotor structure includes a plurality of barrier zones that are substantially impermeable to magnetic flux and that are disposed relative to the main magnets in such a manner that a substantial portion of the magnetic flux entering into a main magnet comes from at least one south pole adjacent to the magnet and a substantial portion of the magnetic flux leaving a magnet goes towards at least one north pole adjacent to the magnet.

Other preferred but non-limiting features of the machine of the invention are as follows:

- the main permanent magnets are disposed essentially radially in the rotor and are suitable for generating magnetic flux all in the same tangential direction, and the poles of the rotor are defined by cavities receiving said main magnets alternating with other cavities that are essentially radial and that define said barrier zones;
- said cavities open out into the periphery of the rotor so as to separate the poles from one another;
- said cavities are separated in pairs by respective zones of the rotor structure having a minimum section selected to minimize leakage flux while still permitting defluxing of the machine;
- said cavities are separated from a central orifice for a rotor shaft by a rotor structure zone having a minimum section selected in such a manner as to minimize leakage flux while permitting defluxing of the machine;
- the main permanent magnets are distributed essentially tangentially in the rotor and are suitable for generating magnetic flux all having the same radial direction, and the poles of the rotor are defined firstly in register with said main magnets and secondly in register with the intermediate zones of the rotor structure between said main magnets;
- the main magnets are set back from the peripheral surface of the rotor structure;
- the radially outer surfaces of the main magnets define a portion of the peripheral surface of the rotor;
- the poles of the rotor are separated by slots, and each main magnet extends tangentially substantially between two adjacent slots;
- the distance between the bottoms of said slots and the respective associated main magnet is selected to minimize leakage flux while permitting defluxing of the machine;
- the rotor structure possesses a plurality of cavities extending between the main magnets and the central region of the rotor and which define said barrier zones in such a manner as to channel the flux between said intermediate zones and the radially inner faces of said main magnets;
- the rotor possesses alternating radially-oriented tangential-flux main magnets and tangentially-oriented radial-flux main magnets; and
- said cavities defining said barrier zones are filled with a material selected from: air; plastics materials; and non-magnetic metals.

Advantageously, the machine as defined above constitutes a motor vehicle alternator or alternator-starter.

Other features, objects, and advantages of the present invention will appear better on reading the following detailed description of preferred embodiments thereof, given by way of non-limiting example and made with reference to the accompanying drawings, in which:

FIG. 1 is a diagrammatic fragmentary cross-section view of a rotary machine constituting a first embodiment of the invention;

FIG. 2 is a diagrammatic fragmentary cross-section view of a rotary machine constituting a second embodiment of the invention;

FIG. 6 is a diagrammatic view of a concrete example of a rotor of a machine constituting the third embodiment.

Figure 3:
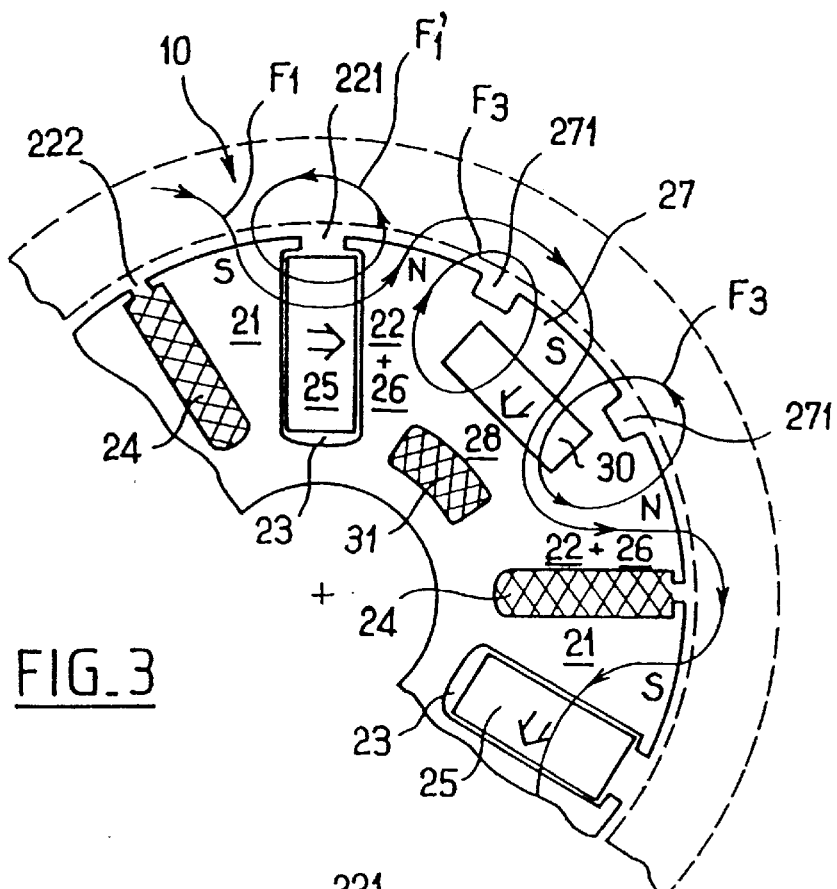
FIG. 3 is a diagrammatic fragmentary cross-section view of a rotary machine constituting a third embodiment of the invention.

As a preliminary point, it should be observed that the description below is given in the context of a rotary machine that possesses twelve rotor poles and twelve stator poles. Naturally, the person skilled in the art will be able to make the necessary adaptations to implement machines possessing some other number of poles.

With reference initially to FIG. 1, a rotary machine possesses a stator 10 and a rotor 20. The stator is a twelve-pole single-phase stator of conventional type, having stator teeth 11 which in pairs define slots 12 in which single-phase stator windings 13 are wound. Naturally, it is also possible to envisage a polyphase stator.

The rotor 10 is a permanent magnet rotor having no windings, and also having twelve poles. The structure of the rotor is preferably built up from a stack of laminations in conventional manner. The twelve alternating N and S poles are provided by six permanent magnets 25, which in this case are disposed in such a manner as to generate flux all extending in the same circumferential direction of the rotor (in this case in the clockwise direction).

More precisely, in the section view of FIG. 1, each magnet 25 is of generally rectangular section with its long axis extending radially, and it is held captive in an essentially complementary cavity 23 formed in the structure of the rotor and defined by two teeth 21 and 22 whose outside surfaces define two adjacent poles of the rotor. In addition, two successive teeth 22 and 21, i.e. a tooth 22 on the clockwise side of a cavity 23 and a tooth 21 on the counterclockwise side of the following cavity 23 also define a cavity 24 that forms a barrier zone that constitutes an obstacle preventing most of the magnetic flux passing therethrough in the circumferential direction. For this purpose, the cavities 24 are of width dpp which is significantly greater than the size of the air gap e between the stator and the rotor, and the magnetically impermeable nature of the cavities is represented in this figure and the next two figures by crosshatching.

Slots 221 and 222 are formed in the circumference of the rotor corresponding respectively to the locations of the magnets 25 and the cavities 24.

It will be understood that with such an arrangement, most of the magnetic flux between the rotor and the stator follows the path represented by arrows F1 and F1', with flux leaving a magnet 25 reaching the opposite pole of the following magnet in the clockwise direction by passing through the stator around a strand of the stator winding 13, or reaches the opposite pole of the same magnet by passing round the adjacent strand of the stator winding. Alternating north and south poles are thus defined at the surface of the rotor 20 with twelve poles being defined by six teeth 21 alternating with six teeth 22, and with this being done while using only six magnets 25. This makes it possible to provide the rotor at significantly lower cost for given nominal flux, given that the number of magnets is equal to only half the number of poles. If a large amount of flux is required, then it is advantageous to use magnets based on rare earths.

It can thus be seen that the leakage flux from the magnets 25 that might pass between the bottoms of the cavities 24 and the central orifice 201 for a rotor shaft (see arrow F2) can be reduced to as little as possible by reducing firstly the minimum distance between each magnet cavity 23 and the adjacent non-magnetic cavity 24, and secondly by reducing the minimum distance between the bottom of each non-magnetic cavity 24 and the central orifice 201. These distances are naturally selected so as to avoid compromising the magnetic stability of the rotor and its electrical performance.

Simultaneously, if the machine needs to be capable of giving rise to a high level of defluxing, as applies in particular to a lightly-loaded alternator, then these distances are selected in such a manner as to make such defluxing possible.

It should be observed at this point that since the purpose of the cavities 24 is to establish an obstacle to magnetic flux, they can either be left empty (i.e. filled with air), or else they can be filled with a non-magnetic material such as a plastics material, aluminum, etc.

With reference now to FIG. 2, there can be seen a second embodiment of the invention in which the magnets no longer generate flux in a direction that is essentially tangential as in FIG. 1, but generate flux that is essentially radial. The stator 10 is essentially identical to that of FIG. 1 (and could likewise also be a polyphase stator), and it is not described again.

The rotor in FIG. 2 has a series of twelve poles corresponding to six zones 26 of the rotor structure alternating with six zones 27 of the rotor structure, the poles being separated by slots 271 formed in the periphery of the rotor structure.

Set back inwards from the zones 27, there are provided six respective permanent magnets 30 of generally rectangular shape having their long axes extending in a tangential direction, with these magnets generating magnetic flux that is directed radially inwards, as shown. The zones 26 of the rotor structure have no magnets.

In addition, the rotor structure has a series of cavities 31 surrounding the central orifice 201 for the rotor shaft and extending essentially continuously between said orifice and the magnets 30 so as to form barrier zones opposing to a large extent any magnetic flux traveling radially through them. These cavities 31 co-operate with the cavities (no reference number) receiving the magnets 30 to define zones 28 in the rotor structure.

If these cavities 31 are left empty, they contribute to reducing the weight of the rotor. Otherwise, if it is desired to increase the inertia of the rotor, they can be filled with a non-magnetic material of suitable density.

It will be understood that with this arrangement, the magnetic flux from the magnets 30 can propagate in limited manner only towards the center of the rotor. As a result, the magnetic flux generated by each magnet 30 propagates in a loop as represented by arrows F3, passing through the zone 28 underlying the magnet and through the zones 26 situated on either side thereof, and also leaving the rotor and reaching the stator 10 to pass around two strands of the stator windings, and then returning to the rotor in its zone 27.

Thus, in this case also, an alternating succession of twelve N and S poles is defined using only six magnets 30.

It should be observed at this point that this second embodiment makes a high level of defluxing possible, and that this is determined mainly by the distance between the bottom of each slot 271 and the adjacent magnet, and by the distance between each magnet and the adjacent air gap surface.

It should also be observed that this arrangement of magnets within the structure of the rotor makes it easy to withstand the centrifugal forces to which the magnets are exposed while the rotor is rotating. In a variant, it is naturally possible to provide for the magnets 30 to be mounted at the surface, in which case they are retained by claws of stubs of the rotor structure.

FIG. 3 shows a third embodiment of the invention in which the arrangements of the first and second embodiments are combined. This is again a twelve-pole rotor co-operating with a stator 10 of the same type as that described above (or, as decried above, a polyphase rotor).

The rotor has three tangential-flux magnets 25 as in FIG. 3 and three radial-flux magnets 30 as in FIG. 2. Each magnet 25 is associated with a cavity 24 that forms a barrier for magnetic flux, this cavity being situated on the anticlockwise side of the magnet 25 and being separated therefrom by a tooth 21. Furthermore, each magnet 30 is associated firstly on its radially outer side with a zone 27 defined by two slots 271, and secondly on its radially inner side by a zone 28 defined inwardly by a cavity 31. These individual cells are juxtaposed in such a manner that a tooth 22 corresponding to an N pole in the first embodiment coincides with a zone 26 also corresponding to an N pole in the second embodiment. In this respect, these zones of the rotor structure are labeled "22+26" in FIG. 3.

In this third embodiment, the behaviors of the first and second embodiments are combined, and flux follows paths F1, F1' and F3 as shown.

In this case, defluxing can take place both in the rotor structure zone that surrounds the central orifice 201 and in the zones situated between the slots 271 and the magnets 30.

Figure 4:
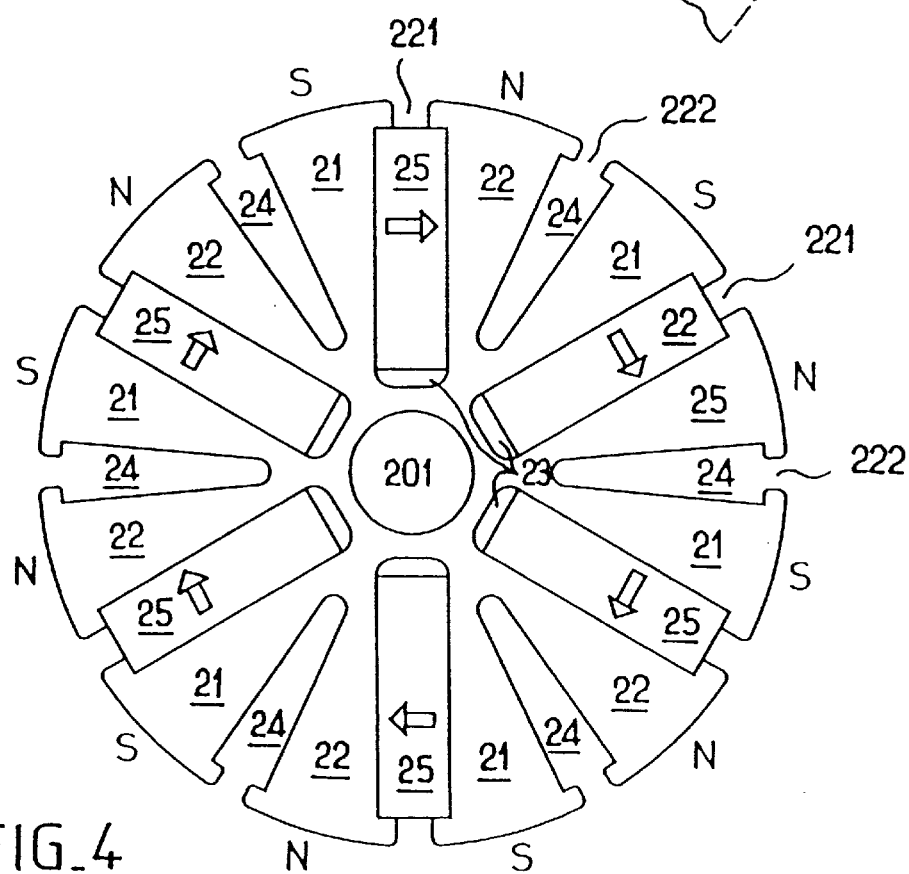
FIG. 4 is a diagrammatic view of a concrete example of a rotor of a machine constituting the first embodiment.

FIG. 4 illustrates a concrete embodiment of a twelve-pole rotor implemented on the principle shown in FIG. 1. The corresponding elements and paths thereof are given the same reference symbols. In FIG. 4, it can be seen that in order to enable magnets 25 of sufficiently large size to be housed, the cavities 4 taper progressively inwards from the outside.

Figure 5B:
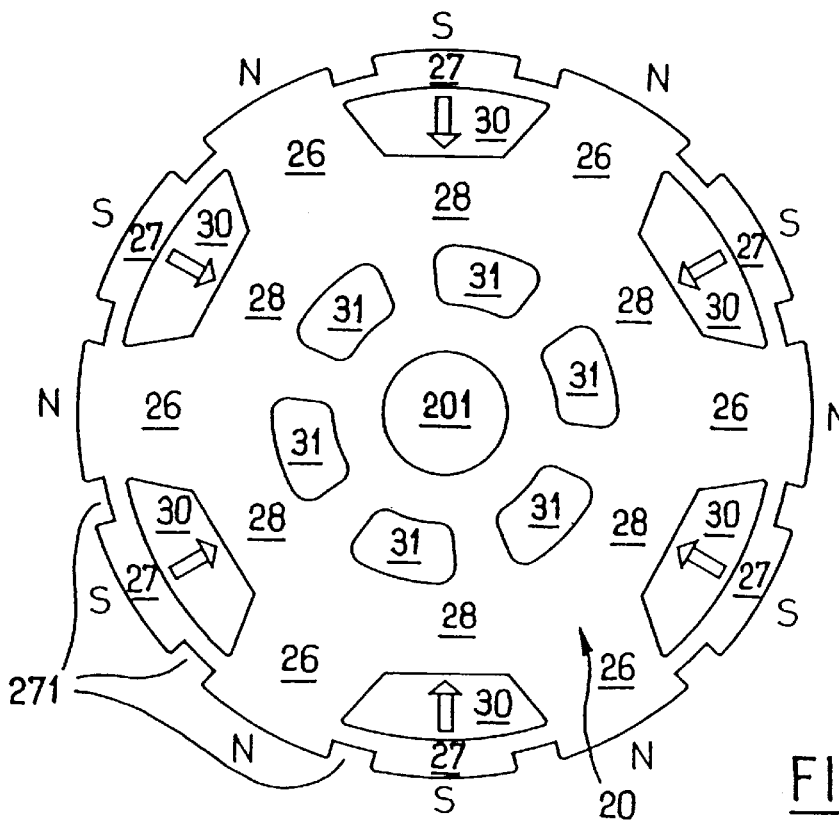
FIGS. 5a and 5b are diagrammatic views of two concrete examples of rotors for machines constituting the second embodiment.
Figure 5A:
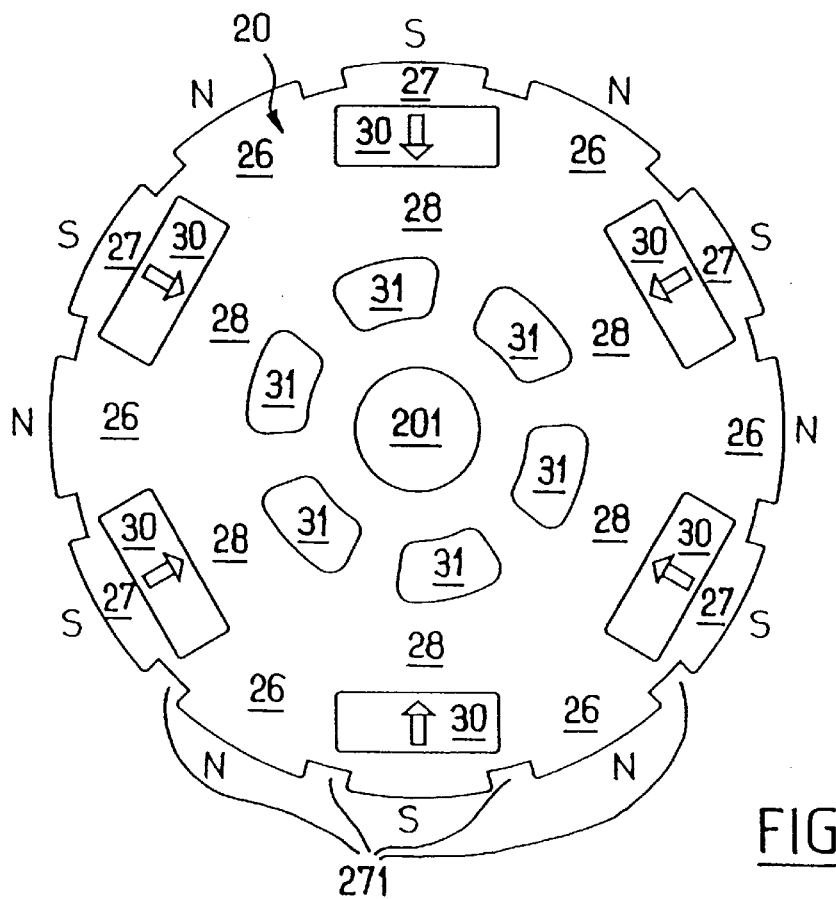

FIG. 5a shows a concrete embodiment of a twelve-pole rotor implementing the principle of FIG. 2. FIG. 5b shows a variant embodiment in which the magnets 30 are of symmetrically trapezoidal shape with circumferential size that decreases on going radially inwards, thereby causing the short sides thereof to slope in a manner that enhances magnetic flux flow towards the adjacent N poles.

Finally, FIG. 6 shows a concrete embodiment of a twelve-pole rotor implemented using the combined principle of FIG. 3. In this case, it can be seen that for reasons associated with rotor design and mechanical strength, the cavities 23 that receive the tangential-flux magnets 25 are extended radially inwards by extensions 231 which enable the leakage flux between the bottoms of said cavities and the central orifice 201 of the rotor to be reduced.

As mentioned above, the invention is applicable to any permanent excitation AC generator or motor, and in particular to motor vehicle alternators and alternator-starters.

Naturally, the present invention is not limited to the embodiments described and shown, and the person skilled in the art can make any variant or modification within the spirit of the invention.

In particular, to channel the magnetic flux generated by the permanent magnets to a greater extent, and thus improve the performance of the machine, it is possible to have smaller secondary magnets situated in regions of the rotor— other than the regions receiving the main magnets 25 or 30—in which such leakage flux is likely to appear.

What is claimed is:

1. A rotary electric machine comprising a stator possessing a plurality of slots receiving stator windings, and a rotor including excitation means constituted by main permanent magnets received in a rotor structure to define a plurality of successive north and south poles (N, S), the number of main permanent magnets provided being half the number of poles, wherein the rotor structure includes a plurality of barrier zones that are substantially impermeable to magnetic flux and that are disposed relative to the main magnets in such a manner that a substantial portion of the magnetic flux entering into a main magnet comes from at least one south pole adjacent to the magnet and a substantial portion of the magnetic flux leaving a magnet goes towards at least one north pole adjacent to the magnet.

2. A machine according to claim 1, wherein the main permanent magnets are disposed essentially radially in the rotor and are suitable for generating magnetic flux all in the same tangential direction, and wherein the poles of the rotor are defined by cavities receiving said main magnets alternating with other cavities that are essentially radial and that define said barrier zones.

3. A machine according to claim 2, wherein said cavities open out into the periphery of the rotor so as to separate the poles from one another.

4. A machine according to claim 2, wherein said cavities are separated in pairs by respective zones of the rotor structure having a minimum section selected to minimize leakage flux while still permitting defluxing of the machine.

5. A machine according to claim 2, wherein said cavities are separated from a central orifice for a rotor shaft by a rotor structure zone having a minimum section selected in such a manner as to minimize leakage flux while permitting defluxing of the machine.

6. A machine according to claim 2, wherein said cavities defining said barrier zones are filled with a material selected from: air; plastics materials; and non-magnetic metal.

7. A machine according to claim 1, wherein the main permanent magnets are distributed essentially tangentially in the rotor and are suitable for generating magnetic flux all having the same radial direction, and wherein the poles of the rotor are defined firstly in register with said main magnets and secondly in register with the intermediate zones of the rotor structure between said main magnets.

8. A machine according to claim 7, wherein the main magnets are set back from the peripheral surface of the rotor structure.

9. A machine according to claim 8, wherein the poles of the rotor are separated by slots, and wherein each main magnet extends tangentially substantially between two adjacent slots.

10. A machine according to claim 7, wherein the radially outer surfaces of the main magnets define a portion of the peripheral surface of the rotor.

11. A machine according to claim 10, wherein the poles of the rotor are separated by slots, and wherein each main magnet extends tangentially substantially between two adjacent slots.

12. A machine according to claim 7, wherein the poles of the rotor are separated by slots, and wherein each main magnet extends tangentially substantially between two adjacent slots.

13. A machine according to claim 12, wherein the distance between the bottoms of said slots and the respective associated main magnet is selected to minimize leakage flux while permitting defluxing of the machine.

14. A machine according to claim 7, wherein the rotor possesses a plurality of cavities extending between the main magnets and the central region of the rotor and which define said barrier zones in such a manner as to channel the flux between said intermediate zones and the radially inner faces of said main magnets.

15. A machine according to claim 14, wherein said cavities defining said barrier zones are filled with a material selected from: air; plastics materials; and non-magnetic metal.

16. A machine according to claim 14, wherein the rotor possesses alternating radially-oriented tangential-flux main magnets and tangentially-oriented radial-flux main magnets.

17. A machine according to claim 1, comprising a motor vehicle alternator or alternator-starter.

* * * * *